(12) United States Patent
Pedlar et al.

(10) Patent No.: US 10,293,673 B2
(45) Date of Patent: May 21, 2019

(54) ELECTRIC CREEP TORQUE CONTROL IN VEHICLES HAVING A MANUAL/MECHANICAL TRANSMISSION

(71) Applicant: FORD GLOBAL TECHNOLOGIES, LLC, Dearborn, MI (US)

(72) Inventors: Christopher Edward Pedlar, Chelmsford (GB); David Hesketh, Ingatestone (GB)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 15/261,078

(22) Filed: Sep. 9, 2016

(65) Prior Publication Data

US 2017/0072943 A1 Mar. 16, 2017

(30) Foreign Application Priority Data

Sep. 10, 2015 (GB) .................................. 1516058.3

(51) Int. Cl.
*B60K 6/36* (2007.10)
*B60W 10/06* (2006.01)
*B60W 10/08* (2006.01)
*B60W 30/18* (2012.01)
(Continued)

(52) U.S. Cl.
CPC ................. *B60K 6/36* (2013.01); *B60K 6/48* (2013.01); *B60W 10/06* (2013.01); *B60W 10/08* (2013.01); *B60W 30/18063* (2013.01); *B60K 6/485* (2013.01); *B60K 2006/4825* (2013.01); *B60W 2510/101* (2013.01); *B60W 2540/04* (2013.01);
(Continued)

(58) Field of Classification Search
CPC ..... B60W 30/18063; B60W 30/18118; B60W 2540/04; B60W 2540/10; B60W 2540/12; B60W 2540/14; B60W 2540/16; B60W 2510/101; B60W 10/08; B60W 10/06; B60W 2710/083; B60K 6/36; B60K 6/48;
(Continued)

(56) References Cited

U.S. PATENT DOCUMENTS 5,343,970 A 9/1994 Severinsky
7,035,727 B2 * 4/2006 De La Salle .......... B60K 6/485
477/114

(Continued)

FOREIGN PATENT DOCUMENTS

WO WO-2013112179 A1 * 8/2013 ............ B60W 10/08

OTHER PUBLICATIONS

Great Britain Combined Search and Examination Report for Great Britain Application No. 1516058.3 dated Mar. 15, 2016.

*Primary Examiner* — Jacob S. Scott
*Assistant Examiner* — Lori Wu
(74) *Attorney, Agent, or Firm* — Dave Kelley; Brooks Kushman P.C.

(57) ABSTRACT

A system for providing electric creep in a manual transmission vehicle having an accelerator pedal, a brake pedal, and an engine uses an electric motor configured to provide creep torque to a transmission output shaft when the manual transmission is in neutral, the electric creep mode is activated and the engine is auto-stopped. The system may provide forward or reverse creep torque. The system may cancel the electric creep in response to a vehicle door opening, a driver unbuckling a seatbelt, or depressing the accelerator pedal or the clutch pedal, or shifting the manual transmission out of neutral.

19 Claims, 5 Drawing Sheets

(51) Int. Cl.
*B60K 6/48* (2007.10)
*B60K 6/485* (2007.10)

(52) U.S. Cl.
CPC ..... *B60W 2540/10* (2013.01); *B60W 2540/12* (2013.01); *B60W 2540/14* (2013.01); *B60W 2540/16* (2013.01); *B60W 2710/083* (2013.01); *B60Y 2300/18058* (2013.01); *Y02T 10/6221* (2013.01); *Y02T 10/6226* (2013.01); *Y02T 10/6252* (2013.01); *Y02T 10/6286* (2013.01); *Y02T 10/7258* (2013.01); *Y10S 903/915* (2013.01)

(58) Field of Classification Search
CPC .... B60K 2006/4825; B60K 2006/4808; B60Y 2300/18058
See application file for complete search history.

(56) References Cited

U.S. PATENT DOCUMENTS

| | | |
|---|---|---|
| 7,691,027 B2 | 4/2010 | Soliman et al. |
| 8,900,093 B2 | 12/2014 | Natsume |
| 9,457,792 B2 | 10/2016 | Bradley et al. |
| 2010/0089673 A1 | 3/2010 | Wisniewski |
| 2012/0295757 A1 | 11/2012 | Watanabe et al. |
| 2012/0303233 A1* | 11/2012 | Kato ................ B60T 7/12 701/70 |
| 2014/0041179 A1* | 2/2014 | Bradley ............ B60K 6/48 29/401.1 |
| 2015/0184726 A1* | 7/2015 | Rekow ............. F16H 3/72 475/5 |
| 2015/0224976 A1 | 8/2015 | Wang et al. |

\* cited by examiner

ELECTRIC CREEP TORQUE CONTROL IN VEHICLES HAVING A MANUAL/MECHANICAL TRANSMISSION

CROSS-REFERENCE TO RELATED APPLICATIONS

This application claims foreign priority benefits under 35 U.S.C. § 119(a)-(d) to GB 1516058.3 filed Sep. 10, 2015, which is hereby incorporated by reference in its entirety.

TECHNICAL FIELD

This disclosure relates to providing and managing creep torque in an electrified vehicle including electrified vehicles having a manual transmission.

BACKGROUND

One of the considerable benefits of an automatic transmission is the ability to creep forward in heavy traffic by simply releasing the foot brake. In contrast, a manual transmission vehicle has to be eased gently forward under control from the accelerator, brake and clutch pedals, which quickly becomes tiresome for the driver and is not efficient from the perspective of the fuel economy.

The issue of fuel economy under such conditions has been addressed by the introduction of engine start-stop technology which typically requires the transmission to be in neutral for the engine to stop in vehicles having a manual transmission. As a result, in a manual transmission vehicle with start-stop technology, the user not only has to control forward motion with accelerator, brake and clutch, but also has to shift to neutral when the vehicle stops. The repeated shifting from neutral to first gear, the repeated stopping and starting of the engine and the requirement to operate accelerator, brake and clutch combine to create an unsatisfactory experience for the driver.

In addition, hybrid electric vehicles (HEVs) typically have multiple power sources, i.e. an internal combustion engine and an electric motor. The role of the electric motor differs depending on the type of hybrid vehicle.

SUMMARY

According to one or more embodiments of the present disclosure, a system for providing electric creep in a manual transmission vehicle includes an accelerator pedal, a brake pedal, and a combustion engine which is the sole source of power under normal operation. The system includes an electric motor for providing low speed motive force for the vehicle and a controller configured to switch off the combustion engine when the electric creep function is activated. The controller is further configured to modulate the torque of the electric machine and resulting speed of the vehicle solely on the basis of the extent of depression of the brake pedal. The controller is further configured to cancel the electric creep function on activation of the accelerator pedal or the clutch pedal.

The system may further include a control button configured to initiate electric creep mode. In a manual transmission vehicle in which the gear selection is controlled by a gear lever, the electric creep control button may be provided on the gear lever.

The use of a simple dedicated button for initiating electric creep ensures that the driver remains in control of the propulsion method at all times. The provision of the button on the gear lever is convenient for the driver as the heavy, stop/start traffic conditions in which the electric creep functionality is most useful will necessitate changing gear and therefore the driver's hand will necessarily be on the gear lever anyway.

The controller may be further configured to cancel the electric creep function on the basis of a further user action, which may comprise one or more of the following, individually or in combination: unbuckling of a driver's seat belt; opening of a driver's door and pressing the dedicated electric creep button.

The controller may be further configured to cancel the electric creep function if the level of charge in the battery reaches a predetermined threshold level, i.e. the level of battery charge is sufficiently low that continuation of use of the electric creep function could result in the electric machine, potentially including the starter motor, being nonfunctional.

There may be occasions when it is not convenient for the driver to cancel electric creep by the depression of the accelerator or clutch. For example, if the driver leaves the vehicle or is attending to rear seat passengers. Various embodiments may cancel the electric creep mode based on factors indicative of the absence of the driver from the driving position.

The electric motor may be configured to provide low speed motive force in forward and backward directions. The control button may be configured to enable the driver to select forwards or backwards creep. This additional functionality allows the electric creep to be used when parking the vehicle.

The electric motor may be connected to a transmission output shaft.

Embodiments may include a controller for providing electric creep in a manual transmission hybrid vehicle comprising a combustion engine and an electric motor/generator and configured to be controlled by accelerator, brake and clutch pedals. The controller may be configured to: switch off the combustion engine when the electric creep function is activated; modulate the speed of the vehicle solely on the basis of the extent of depression of the brake pedal; cancel the creep function on activation of the accelerator pedal; and cancel the creep function on the basis of one or more further actions. The further actions may include the depression of the clutch pedal; the unbuckling of the driver's seat belt; the opening of the driver's door and/or the activation of a dedicated button.

The provision of electric creep on a manual transmission vehicle is intended to provide a vehicle that has the advantages of an automatic vehicle without the attendant reduction in fuel economy and increase in cost. The provision of low speed vehicle propulsion controlled simply by brake modulation for start-stop traffic conditions is one of the main benefits of an automatic transmission.

Electric creep provides a means of low speed electric propulsion for the vehicle and it can be activated when the transmission is in neutral and the engine is auto-stopped. The movement of the vehicle is controlled solely by the modulation of the brake pedal.

The electric creep function can be initiated by pressing a control button located on the gear lever. This is a practical location for such a button as the vehicle may have to be placed into neutral for the electric creep function to be activated and therefore the driver's hand would necessarily be on the gear lever and therefore easily able to press the button.

Pressing the accelerator or clutch pedals would cancel the electric creep function and restart the engine in line with the start-stop system on board the vehicle and therefore enable the vehicle to be driven conventionally.

Under certain circumstances, the accelerator or clutch pedal would not be depressed, despite there being a need to exit the electric creep mode. This might arise if the driver needed to leave the vehicle, or at least leave the driving position. As a result, the electric creep function can be provided with further cancellation routes including a further press of the electric creep button on the gear lever, the unbuckling of the driver's seat belt or the opening of the driver's door.

In addition, the motor providing the electric creep can be configured to provide either forwards or backwards movement of the vehicle. This means that, in addition to the primary use of the system in heavy traffic where the vehicle needs to make numerous small, low speed movements to keep up with the creeping forward of the traffic, the system can also be deployed to aid the parking of the vehicle. The provision of forward and backward motion enables the vehicle to be parked entirely under the power of the electric motor without any assistance from the vehicle engine. This is particularly advantageous when the vehicle is being parked inside a building, such as a garage, so engine fumes do not permeate through the building.

To facilitate selection of forward or backward motion, the button on the gear lever may have a rocker or slide function to enable the user to select between forward and backward motion. This switch may be set to default to forward motion as this is likely the predominant use of the system.

The electric machine or motor used to provide the electric creep may have a power rating in the region of 10 kW and may be connected to the output shaft of the transmission in a manner to rotate the output shaft when the transmission is in neutral. The electric machine or motor may be directly connected to the transmission output shaft and/or connected through a gearing arrangement to rotate the transmission output shaft when the transmission is in neutral. The electric machine may be part of a mild hybrid facility also providing energy recovery, load shifting and launch assistance.

The representative embodiments will now be further and more particularly described, by way of example only, and with reference to the accompanying drawings, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
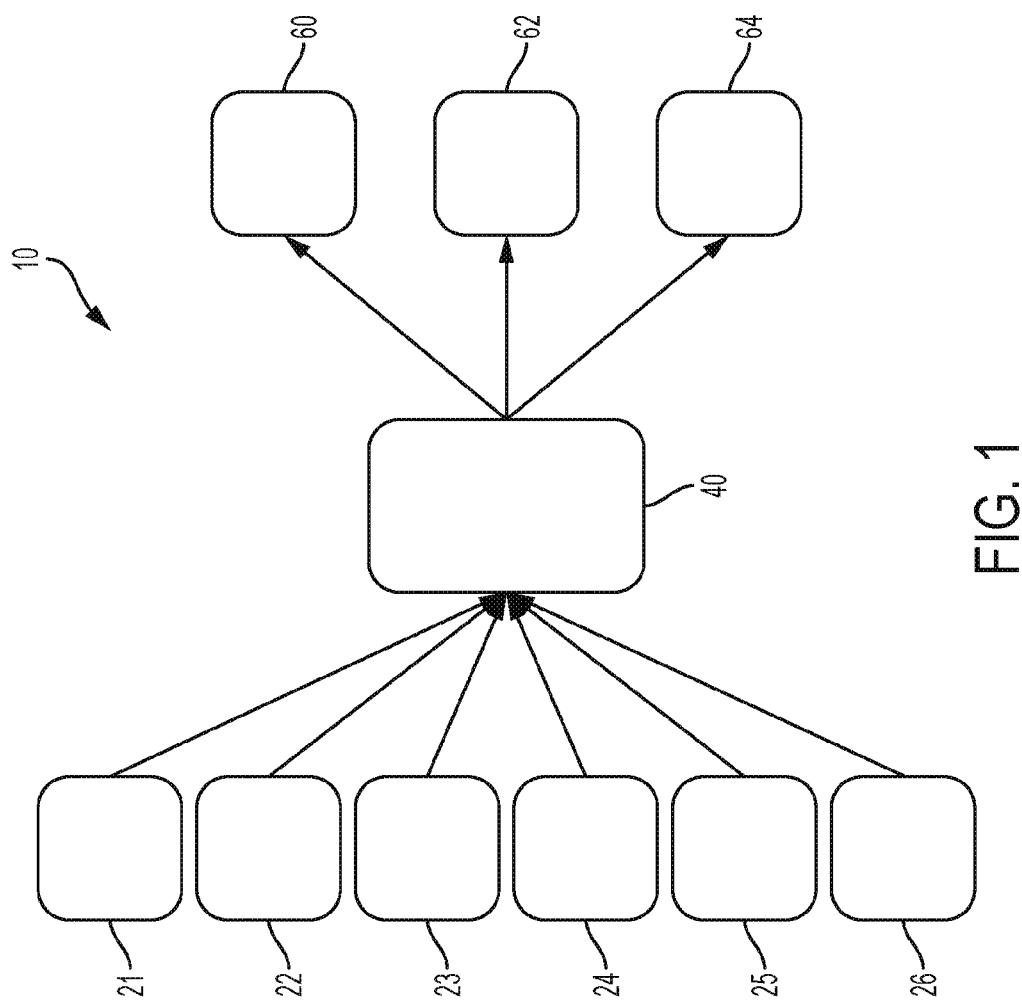
FIG. 1 shows schematically the constituent parts of an example of one embodiment of the disclosure.

FIG. 1 shows the integers that form part of a system 10 of a representative embodiment. The system 10 is implemented within a powertrain control module 40. The powertrain control module 40 is configured to receive data from a plurality of sensors positioned in different locations around the vehicle. Data received from some of the sensors can be used by the powertrain control module 40 to implement an electric creep functionality.

An accelerator pedal position sensor 21, brake pedal pressure sensor 22 and clutch pedal or clutch position sensor 23 provide data indicative of the extent of depression of the respective pedal. Whilst the data provided by the sensor will include data indicative of the extent of depression of the respective pedal, the electric creep system 10 requires only a subset of that data showing whether there is any depression of the pedal or not.

Gearbox position sensor 24 provides data about the position of the gear lever, in particular whether the gear lever is in the neutral position or not.

An e-Creep driver control switch 25 is provided. This can be a binary switch with "on" and "off" positions. Alternatively, it may be a rocker switch with "forward", "reverse" and "off" positions. Of course, other combinations of an on/off and forward/reverse switches or buttons are possible.

Further sensors 26 collate data indicative of the driver potentially leaving the vehicle. These can include a sensor monitoring engagement of the driver's seat belt and a sensor monitoring the opening of the driver's door, for example.

It will be appreciated that the accelerator, brake and clutch pedals sensors 21, 22, 23 are configured to provide data to the powertrain control module 40 for the normal functioning of this module. Furthermore, a seat belt engagement sensor 26 is typically provided in order to provide a warning should the driver attempt to drive the car without fastening the seat belt. Additional sensors are not required at these locations for the deployment of the electric creep system. The powertrain control module 40 is also configured to receive and interpret the data appropriately for the deployment of the electric creep functionality.

The deployment of the electric creep functionality is achieved via an electric motor 60 that is integrated into the propulsion system of the vehicle.

The powertrain control module 40 additionally provides data to an e-Creep driver interface 62. This interface 62 may be embodied as a lamp, telltale, or message within the instrument cluster.

In addition, the powertrain control module 40 provides data to a module 64 configured to control the reversing lamp. This ensures that when the e-Creep system is deployed in the reverse direction with the gear lever and transmission in neutral, the vehicle's reversing lights are deployed just as they would be if the vehicle was being reversed under power from the combustion engine with the gear lever in the reverse position.

Figure 2:
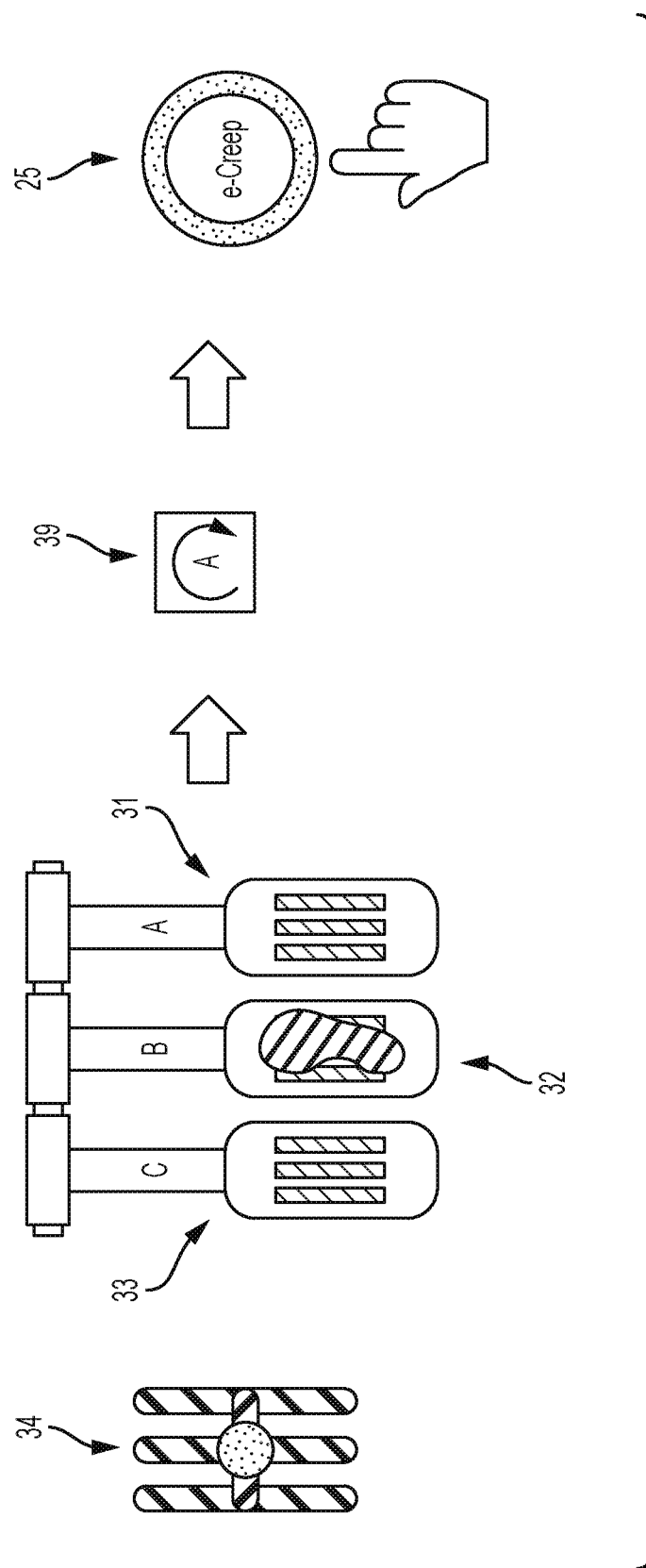
FIG. 2 shows the electric creep entry conditions of one or more embodiments of the disclosure.

FIG. 2 summarizes the entry conditions for the e-Creep system 10 of a representative embodiment. The gear lever 34 must be in the neutral position; the accelerator (A) pedal 31 and clutch (C) pedal 33 must be fully released, i.e. not depressed at all or less than an associated threshold to account for variations across vehicles. This configuration results in the initiation of the auto-stop functionality 39. Once the combustion engine has been auto-stopped, then if the brake (B) pedal 32 is depressed and the e-Creep control switch 25 has been activated, the vehicle will enter an e-Creep mode. In this mode, the e-Creep torque is controlled solely by the modulation of the brake pedal. If the e-Creep control switch 25 includes forward and reverse options, then the creep torque will move the vehicle either forwards or backwards depending on the position of the switch 25.

Figure 3:
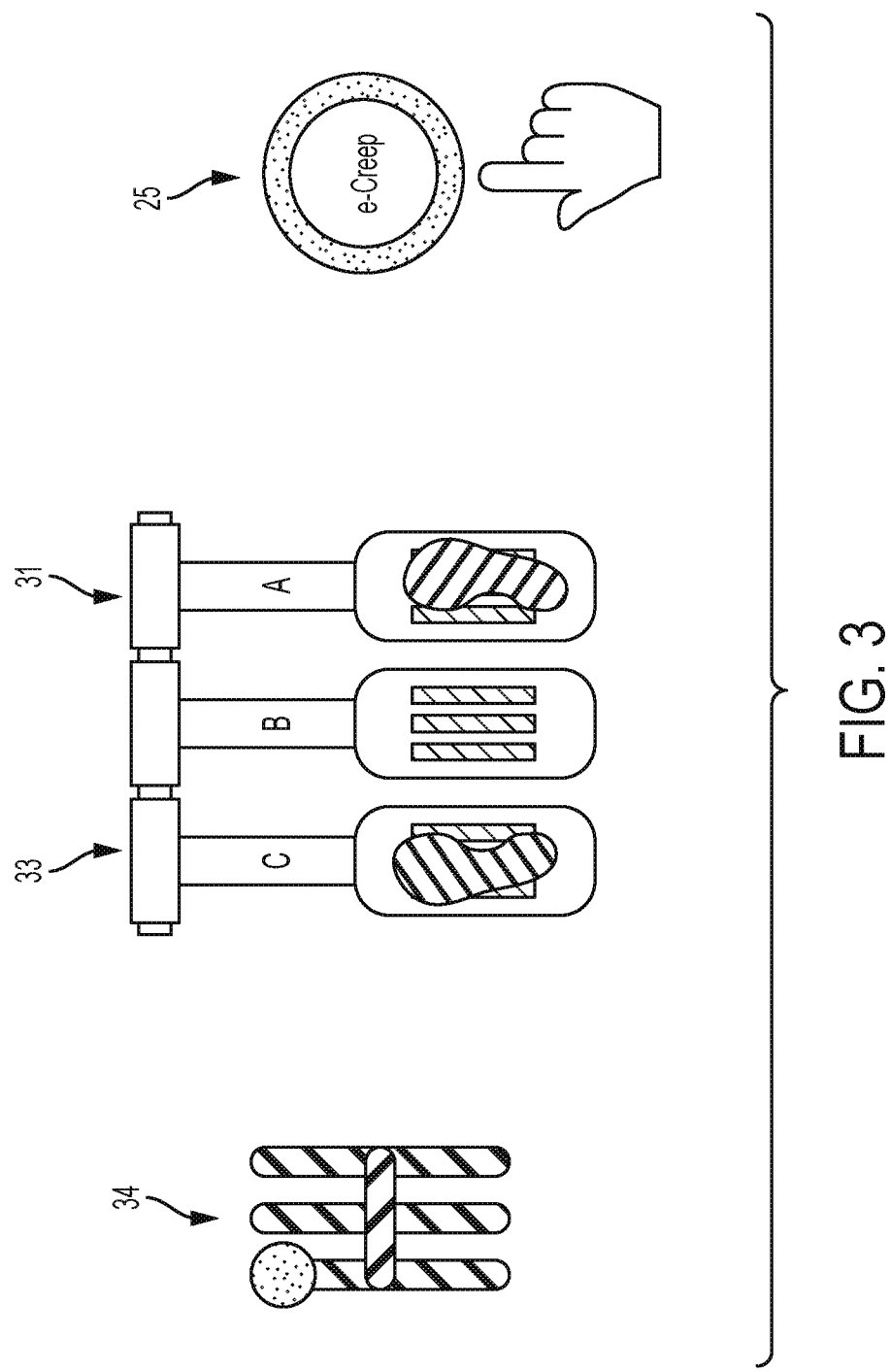
FIG. 3 shows the electric creep exit conditions of one or more embodiments of the disclosure.

FIG. 3 summarizes the exit conditions for the e-Creep system 10 of a representative embodiment. The system 10 will be cancelled if any one of the following conditions is met: moving the gear lever 34 out of the neutral position; the accelerator (A) pedal 31 or clutch (C) pedal 33 is depressed or depressed beyond a threshold; or the e-Creep control switch 25 is pressed. If the control switch 25 is a slider or non-latching button with three positions, "forward," "reverse" and "off," then the system 10 is cancelled when the button or slider is moved to the "off" position.

Figure 4A:
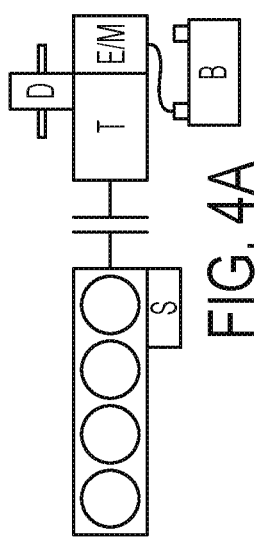
FIGS. 4A-4B show schematically different powertrain configurations with manual or mechanical transmissions according to various representative embodiments of the disclosure.
Figure 4B:
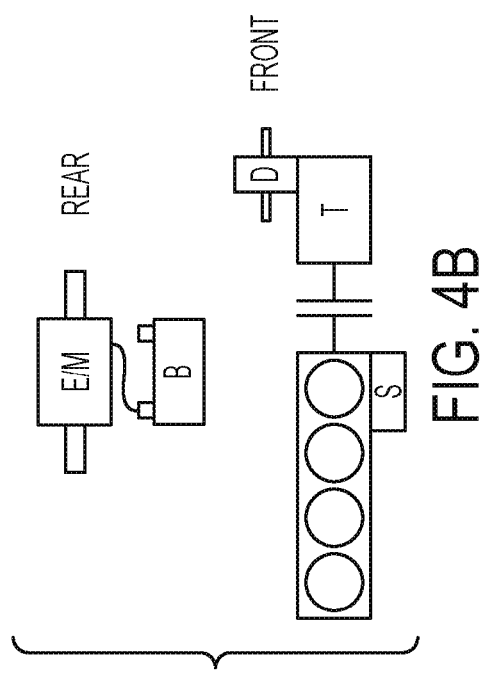

FIGS. 4A-4B show different manual transmission configurations to which the system 10 can be applied. In each of these representative illustrations the combustion engine is depicted as a series of four circles, effectively providing a top view of the cylinder block with the pistons. The other integers are the electric machine E/M, the battery B, the differential or final drive D, the transmission T, and the starter motor S.

FIG. 4A shows a single clutch configuration with a small electric machine E/M. This configuration is optimized with the electric machine partially integrated into the transmission.

FIG. 4B shows an alternative configuration that includes an electric rear axle drive (ERAD). The rear wheels are driven by an electric machine E/M while the front wheels are driven by the internal combustion engine.

Figure 5:
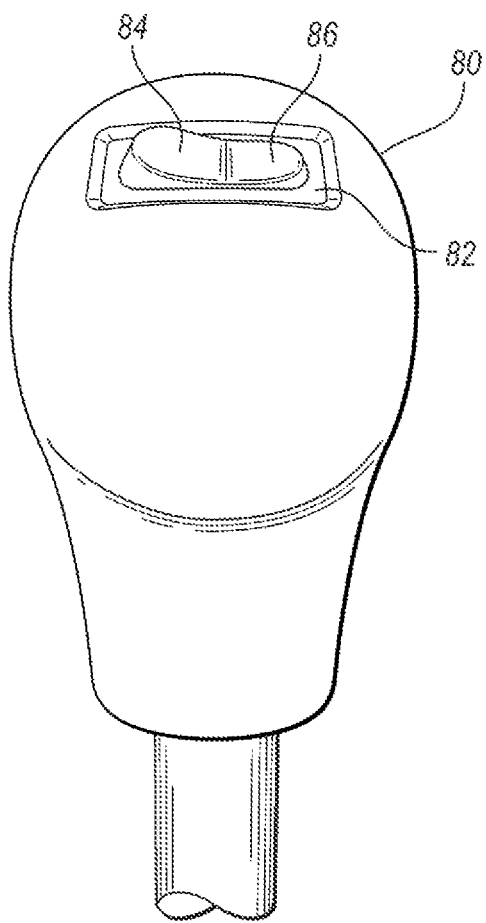
FIG. 5 shows a gear shifter with an e-Creep control switch.

Referring to FIG. 5, the e-Creep control switch may be disposed on a gear shifter 80. In one embodiment, the control switch is a button 82. The button 82 may be a single button or a dual position button having first and second positions 84 and 86. The first position 84 is for forward creep mode, and the second position 86 is for reverse creep mode.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly illustrated or described.

What is claimed is:

1. A vehicle comprising:
an engine;
an accelerator pedal;
a brake pedal;
a clutch pedal;
a manual transmission having an output shaft;
an electric machine configured to rotate the output shaft when the manual transmission is in neutral; and
a controller programmed to:
auto-stop the engine responsive to the accelerator pedal being released, the brake pedal being depressed, and the clutch pedal being released,
responsive to the engine being auto-stopped, the brake pedal being depressed, and creep mode being requested, activate a creep mode, and
responsive to the creep mode being activated, provide creep torque based on position of the brake pedal.

2. The vehicle of claim 1 wherein the controller is further programmed to cancel the creep mode responsive to the clutch pedal being depressed.

3. The vehicle of claim 1 wherein the controller is further programmed to cancel the creep mode responsive to a button being depressed.

4. The vehicle of claim 1 wherein the controller is further programmed to cancel the creep mode in response to depressing the accelerator pedal.

5. The vehicle of claim 1 further comprising a control button actuatable to request the creep mode.

6. The vehicle of claim 1 wherein the controller is further programmed to provide creep torque only when the manual transmission is in neutral.

7. The vehicle of claim 1 further comprising:
a gear lever configured to place the manual transmission in neutral; and
a button on the gear lever configured to request the creep mode.

8. The vehicle of claim 7 wherein the button is configured to select one of forward creep torque and reverse creep torque.

9. The vehicle of claim 1 wherein the controller is programmed to cancel the creep mode in response to unbuckling of a driver seat belt.

10. A controller for providing electric creep in a vehicle comprising a manual transmission, an engine, and an electric machine configured to be controlled by accelerator, brake and clutch pedals, the controller configured to:
switch off the engine when the electric creep is activated;
control the electric machine to provide the electric creep based on extent of depression of the brake pedal; and
cancel the electric creep responsive to the clutch pedal being depressed.

11. The controller of claim 10 wherein the controller is further configured to cancel the electric creep in response to depression of the accelerator pedal.

12. The controller of claim 10 further configured to cancel the electric creep in response to opening of a vehicle door.

13. The controller of claim 10 further configured to cancel the electric creep responsive to the transmission being shifted out of neutral.

14. A vehicle comprising:
an engine;
a manual transmission coupled to the engine;
a motor configured to power driven wheels of the vehicle; and
a controller programmed to
auto-stop the engine responsive to accelerator and clutch pedals being released, a brake pedal being depressed, and the transmission being in neutral, and
responsive to the engine being auto-stopped and electric creep being requested, power the driven wheels via the motor based on position of the brake pedal.

15. The vehicle of claim 14 wherein the controller is further programmed to cancel the electric creep responsive to the clutch pedal being depressed.

16. The vehicle of claim 14 further comprising:
a gear lever configured to place the manual transmission in neutral; and
a button on the gear lever configured to request the electric creep.

17. The vehicle of claim 16 wherein the button includes a first position that corresponds to forward creep and a second position that corresponds to reverse creep.

18. The vehicle of claim 14 further comprising:
a first axle including second driven wheels powered by the engine; and
a second axle including the driven wheels.

19. The vehicle of claim 14 wherein controller is further programmed to cancel the electric creep responsive to the transmission being shifted out of neutral.

* * * * *